United States Patent
Rossi et al.

(10) Patent No.: US 11,367,163 B2
(45) Date of Patent: Jun. 21, 2022

(54) ENHANCED IMAGE PROCESSING TECHNIQUES FOR DEEP NEURAL NETWORKS

(71) Applicant: Apple Inc., Cupertino, CA (US)

(72) Inventors: Francesco Rossi, Sunnyvale, CA (US); Marco Zuliani, San Jose, CA (US); Bartlomiej W. Rymkowski, San Jose, CA (US); Albert Antony, Hayes (GB); Brian P. Keene, Cupertino, CA (US); Xiaojin Shi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 16/794,824

(22) Filed: Feb. 19, 2020

(65) Prior Publication Data
US 2020/0380639 A1 Dec. 3, 2020

Related U.S. Application Data

(60) Provisional application No. 62/855,505, filed on May 31, 2019.

(51) Int. Cl.
*G06T 3/40* (2006.01)
*G06T 11/60* (2006.01)
*G06N 3/04* (2006.01)

(52) U.S. Cl.
CPC ......... *G06T 3/4046* (2013.01); *G06N 3/0454* (2013.01); *G06T 3/4092* (2013.01);
(Continued)

(58) Field of Classification Search
None
See application file for complete search history.

(56) References Cited

U.S. PATENT DOCUMENTS 5,680,475 A 10/1997 Zwierski
6,011,536 A 1/2000 Hertzmann
(Continued)

FOREIGN PATENT DOCUMENTS

CN 106327448 A 1/2017
WO 2017021322 A1 2/2017

OTHER PUBLICATIONS

Gatys, et al., "Image Style Transfer Using Convolutional Neural Networks," IEEE Conference on Computer Vision and Pattern Recognition (CVPR), Jun. 27-30, 2016 (Year: 2016).*
(Continued)

*Primary Examiner* — Andrae S Allison
(74) *Attorney, Agent, or Firm* — Blank Rome LLP

(57) ABSTRACT

Artistic styles extracted from source images may be applied to target images to generate stylized images and/or video sequences. The extracted artistic styles may be stored as a plurality of layers in one or more neural networks, which neural networks may be further optimized, e.g., via the fusion of various elements of the networks' architectures. The artistic style may be applied to the target images and/or video sequences using various optimization methods, such as the use of a first version of the neural network by a first processing device at a first resolution to generate one or more sets of parameters (e.g., scaling and/or biasing parameters), which parameters may then be mapped for use by a second version of the neural network by a second processing device at a second resolution. Analogous multi-processing device and/or multi-network solutions may also be applied to other complex image processing tasks for increased efficiency.

26 Claims, 6 Drawing Sheets

(52) U.S. Cl.
CPC .... *G06T 11/60* (2013.01); *G06T 2207/20081* (2013.01); *G06T 2207/20084* (2013.01)

(56) References Cited

U.S. PATENT DOCUMENTS

| | | | |
|---|---|---|---|
| 6,973,130 | B1 | 12/2005 | Wee et al. |
| 7,933,454 | B2 | 4/2011 | Bressan |
| 8,160,396 | B2 | 4/2012 | Brand |
| 8,189,920 | B2 | 5/2012 | Tomizawa |
| 8,355,592 | B1 | 1/2013 | Shechtman |
| 8,896,622 | B2 | 11/2014 | Winnemoeller |
| 9,036,898 | B1 | 5/2015 | Beeler |
| 9,105,117 | B2 | 8/2015 | Asente |
| 9,135,732 | B2 | 9/2015 | Winn |
| 9,208,539 | B2 | 12/2015 | Choudhury |
| 9,536,293 | B2 | 1/2017 | Lin |
| 9,552,510 | B2 | 1/2017 | Li |
| 9,594,977 | B2 | 3/2017 | Lin |
| 9,665,930 | B1 | 5/2017 | Bedi |
| 9,799,099 | B2 | 10/2017 | Yang |
| 9,940,551 | B1 | 4/2018 | Mordvintsev |
| 10,535,164 | B2 | 1/2020 | Shlens |
| 10,565,757 | B2 | 2/2020 | Oxholm |
| 10,664,718 | B1* | 5/2020 | Rymkowski .......... G06K 9/4628 |
| 10,740,939 | B1* | 8/2020 | Chung .................. G06T 11/001 |
| 10,769,492 | B2* | 9/2020 | Kim .................... G06K 9/00221 |
| 10,891,723 | B1* | 1/2021 | Chung .................. G06N 20/00 |
| 2009/0185747 | A1 | 7/2009 | Segall et al. |
| 2011/0081093 | A1 | 4/2011 | Racape et al. |
| 2011/0115815 | A1 | 5/2011 | Xu |
| 2014/0241592 | A1 | 8/2014 | Yang |
| 2015/0224395 | A1 | 8/2015 | Trombetta et al. |
| 2015/0339570 | A1 | 11/2015 | Scheffler |
| 2015/0371447 | A1 | 12/2015 | Yasutake |
| 2016/0034788 | A1 | 2/2016 | Lin |
| 2016/0188181 | A1 | 6/2016 | Smith |
| 2016/0225164 | A1 | 8/2016 | Tomlin et al. |
| 2017/0139572 | A1 | 5/2017 | Sunkavalli |
| 2017/0140253 | A1 | 5/2017 | Wshah |
| 2017/0213112 | A1 | 7/2017 | Sachs |
| 2017/0220854 | A1* | 8/2017 | Yang ..................... G06K 9/522 |
| 2018/0082407 | A1 | 3/2018 | Rymkowski |
| 2018/0082715 | A1* | 3/2018 | Rymkowski ....... G06K 9/00718 |
| 2018/0158224 | A1* | 6/2018 | Bethge ................... G06T 11/60 |
| 2018/0240257 | A1 | 8/2018 | Yijun |
| 2018/0251239 | A1 | 9/2018 | Pierre |
| 2018/0313119 | A1 | 11/2018 | Taga |
| 2018/0350030 | A1* | 12/2018 | Simons ................ G06T 3/0068 |
| 2018/0373999 | A1* | 12/2018 | Xu ..................... G06K 9/00765 |
| 2019/0026870 | A1* | 1/2019 | Hu .......................... G06T 11/00 |
| 2019/0042882 | A1* | 2/2019 | Kim ..................... G06N 3/0454 |
| 2019/0213444 | A1 | 7/2019 | Zheng |
| 2019/0220746 | A1 | 7/2019 | Liu |
| 2019/0236814 | A1* | 8/2019 | Shlens ................ G06K 9/6256 |
| 2020/0394752 | A1* | 12/2020 | Liu ........................ G06N 5/046 |

OTHER PUBLICATIONS

Huang, et al., "Real-Time Neural Style Transfer for Videos," IEEE Conference on Computer Vision and Pattern Recognition (CVPR), 2017, pp. 783-791. (Year: 2017).*

Ruder, Manuel, Alexey Dosovitskiy, and Thomas Brox. "Artistic style transfer for videos and spherical images." International Journal of Computer Vision 126.11 (2018): 1199-1219. (Year: 2018).*

"An Overview of Normalization Methods in Deep Learning," Machine Learning Explained, 2018, Retrieved from the Internet: URL: https://mlexplained.com/2018/11/30/an-overview-of-normalization-methods-in-deep-learning/ [Retrieved on Mar. 14, 2019].

"Will photo art phenom Prisma raise or get bought?" TechCrunch, Retrieved from the Internet: URL: https://techcrunch.com/2016/07/19/prismagram/ [Retrieved on Jul. 20, 2016].

Azad, et al., "Bangladeshi Style: a Way of Facial Artistic Stylization in Visual Effects," 16th Int'l Conf. Computer and Information Technology, Mar. 8-10, 2014, Khulna, Bangladesh.

Gatys, et al., "Image Style Transfer Using Convolutional Neural Networks," IEEE Conference on Computer Vision and Pattern Recognition (CVPR), Jun. 27-30, 2016.

Gatys, Leon A., Alexander S. Ecker, and Matthias Bethge. "A neural algorithm of artistic style." arXiv preprint arXiv:1508.06576 (2015).

Huang, et al., "Arbitrary Style Transfer in Real-time with Adaptive Instance Normalization," 2017, arXiV:1703.06868 [cs.CV].

Huang, et al., "Real-Time Neural Style Transfer for Videos," IEEE Conference on Computer Vision and Pattern Recognition (CVPR), 2017, pp. 783-791.

Jean, Neal, "Neural network normalization," Jun. 24, 2018, Retrieved from the Internet: URL: https://nealjean.com/ml/neural-network-normalization/ [Retrieved on Mar. 14, 2019].

Jing, et al., "Neural Style Transfer: A Review," arXiv:1705.04058v1, May 11, 2017.

Kwatra et al., "Texture Optimization for Example-based Synthesis," Association for Computing Machinery, Inc., 2005.

Li, Multimodal 2D+3D Facial Expression Recognition with Deep Fusion Convolutional Neural Network, IEEE Transactions on Multimedia, vol. PP, Issue: 99, 2017.

Novak, et al., "Improving the Neural Algorithm of Artistic Style," Ecole normale superieure de Cachan, Cachan, France, May 15, 2016.

Ruder, et al., "Artistic style transfer for videos," arXiv:1604.08610v2, Oct. 19, 2016.

Ulyanov, et al., "Instance Normalization: The Missing Ingredient for Fast Stylization," 2017, arXiv:1607.08022 [cs.CV].

Yan, et al., "Automatic Photo Adjustment Using Deep Neural Networks," ACM Transcations on Graphics, May 16, 2015.

* cited by examiner

ENHANCED IMAGE PROCESSING TECHNIQUES FOR DEEP NEURAL NETWORKS

TECHNICAL FIELD

This disclosure relates generally to the field of digital image processing. More particularly, but not by way of limitation, it relates to techniques for applying machine learning to artistic style transfers, e.g., as embodied in Deep Neural Networks (DNNs).

BACKGROUND

The advent of portable integrated computing devices has caused a wide proliferation of cameras and video devices. These integrated computing devices commonly take the form of smartphones or tablets and typically include general purpose computers, cameras, sophisticated user interfaces including touch sensitive screens, and wireless communications abilities through WiFi, Long Term Evolution (LTE), High Speed Downlink Packet Access (HSDPA) and other cell-based or wireless technologies (WiFi is a trademark of the Wi-Fi Alliance, LTE is a trademark of the European Telecommunications Standards Institute (ETSI)).

The wide proliferation of these integrated devices provides opportunities to use the devices' capabilities to perform tasks that would otherwise require dedicated hardware and software. For example, as noted above, integrated devices such as smartphones and tablets typically have one or more embedded cameras. These cameras generally amount to lens/camera hardware modules that may be controlled through the general purpose computer using firmware and/or software (e.g., "Apps") and a user interface, e.g., including a touch-screen interface and/or touchless control, such as voice control.

The integration of cameras into communication devices such as smartphones and tablets has enabled people to share images and videos in ways never before possible. It is now very popular to acquire and immediately share images and/or videos with other people by either sending the photos via text message, by email, though Apps, or by uploading the photos to an Internet-based website, such as a social networking site or a photo sharing site. Users often desire to apply one or more corrective or artistic filters to their images and/or videos before sharing them with other users or posting them to Internet-based websites. Some such filters may modify the images in a content-independent fashion, e.g., a vignetting effect that darkens the outer borders of the image. Other filters may perform one or more color or brightness mapping techniques to improve the appearance of the image. Still other filters may manipulate each pixel in a programmatically-defined fashion to create a particular "effect," e.g., an antique image effect or a black and white effect.

However, more and more, users desire the ability to apply more complex image processing techniques, e.g., artistic effects, to their captured images and/or video that do not simply perform a mathematical mapping of each pixel value in the image to generate an output image, but instead use artificial intelligence, e.g., machine learning, techniques to imbue the 'essence' of a particular artistic style to their captured images and/or video. One such approach for applying artistic styles to images was initially proposed in Gatys et al., "A Neural Algorithm of Artistic Style," arXiv: 1508.06576v2 [cs.cV], 2 Sep. 2015 (which paper is hereby incorporated by reference and referred to hereinafter as, "Gatys,") and provides a neural algorithm that separates and recombines the content and style of arbitrary images to synthesize stylized artistic versions of the input images. However, the algorithm proposed in Gatys takes a significant amount of time to apply an artistic style to a single image, and also requires a substantial amount of processing power, which is not typically available on users' personal electronic devices.

Due to the substantial time and processing requirements imposed by the Gatys algorithm (and other similar artistic style transfer algorithms using neural network or other forms of artificial intelligence/machine learning), the generation of stylized images or a stylized video sequence in real-time—or even near real-time—on portable electronic devices is often not feasible, given the temporal, memory, and/or processing constraints often faced by personal electronic devices.

SUMMARY

Techniques are disclosed herein for using modified neural network architectures to perform complex image processing tasks, such as applying an artistic style extracted from one or more source images, e.g., paintings, to one or more target images. The extracted artistic style may then be stored as a plurality of layers in one or more neural networks. In some embodiments, two or more stylized target images may be combined and stored as a stylized video sequence. The artistic style may be applied to the target images in the stylized video sequence using various optimization methods, such as the fusion of elements of the networks' architectures and/or the modification of portions of the networks to perform certain tasks to which respective hardware processing devices are best suited.

According to some embodiments, the artistic style may be applied to the target images and/or video sequence of images using a first version of the neural network by a first processing device at a first resolution to generate one or more sets of parameters (e.g., normalization factors), which parameters may then be mapped for use by a second version of the neural network by a second processing device at a second resolution (e.g., via one or more scaling or biasing operations). In some embodiments, the one or more sets of parameters may specifically comprise one or more sets of instance normalization factors for a given layer in the first version of the neural network, which factors may be useful in creating higher quality artistic style transfer output images with the second version of the neural network, e.g., via application of the factors to the corresponding layer(s) of the second version of the neural network.

In other embodiments, the second resolution is substantially larger than the first resolution (e.g., with the second resolution having fifty times—up to hundreds or even thousands of times—more pixels than the first resolution). In still other embodiments, the second processing device may lack the functionality or capability to determine the one or more sets of parameters as determined by the first processing device. In yet other embodiments, the number of data transfers between the first processing device and second processing device are configured to be minimized for improved latency and memory costs, e.g., transferring all sets of parameters in a single transfer operation.

Thus, according to some embodiments, the techniques described herein may include a computer-implemented method, comprising: obtaining a first target image having a first resolution; downscaling the first target image to create a downscaled first target image having a second resolution, wherein the second resolution is less than the first resolution; obtaining a first artistic style transfer neural network; applying, using a first processing device, the first artistic style transfer neural network to the downscaled first target image; determining, using the first processing device, one or more sets of parameters based on the application of the first artistic style transfer neural network; obtaining a second artistic style transfer neural network; determining mappings between the one or more sets of parameters and the second artistic style transfer neural network; and applying, using a second processing device, the second artistic style transfer neural network to the first target image based, at least in part, on the determined mappings to produce a stylized version of the first target image having the first resolution.

Various non-transitory program storage devices are disclosed. The program storage device are readable by one or more processors. Instructions may be stored on the program storage devices for causing the one or more processors to perform the various techniques described herein. Various programmable electronic devices are also disclosed herein, in accordance with the various techniques described herein. Such electronic devices may include one or more image sensors/camera units; a display screen; a user interface; two or more processing devices, e.g., one or more central processing units (CPUs), one or more graphics processing units (GPUs), and/or one or more customized Systems on a Chip (SoCs), e.g., an artificial intelligence (AI)-accelerator chip designed to accelerate mathematical operations typical of deep learning applications, such as processing of images and speech, augmented reality applications, object recognition algorithms, etc.; and a memory coupled to the one or more processing devices. Instructions may be stored in the memory, the instructions causing the two or more processing devices to execute instructions in accordance with the various techniques described herein.

DETAILED DESCRIPTION

Figure 1:
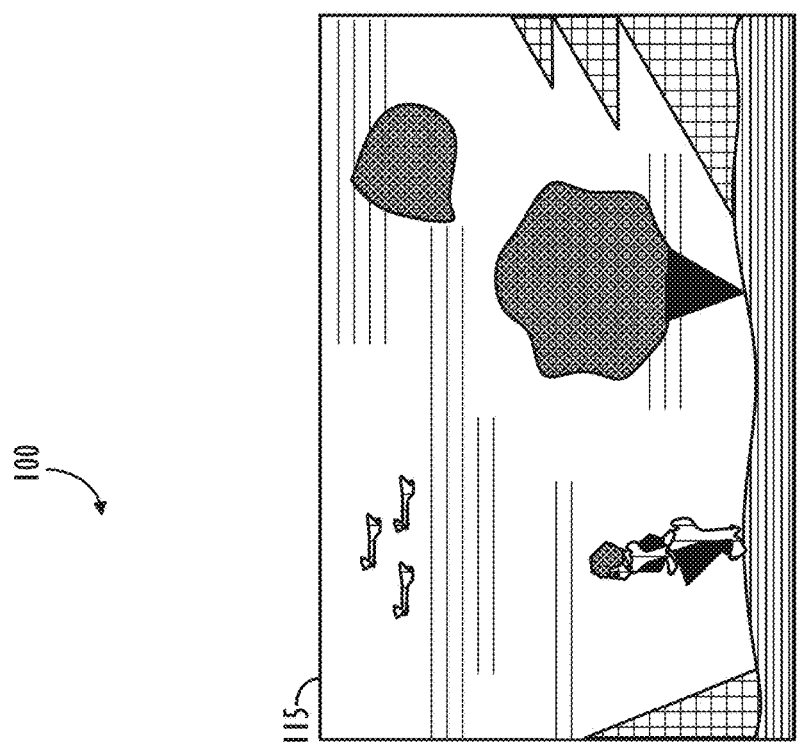
FIG. 1 is an example of an application of an extracted artistic style to a target image, according to one or more embodiments.
Figure 1:
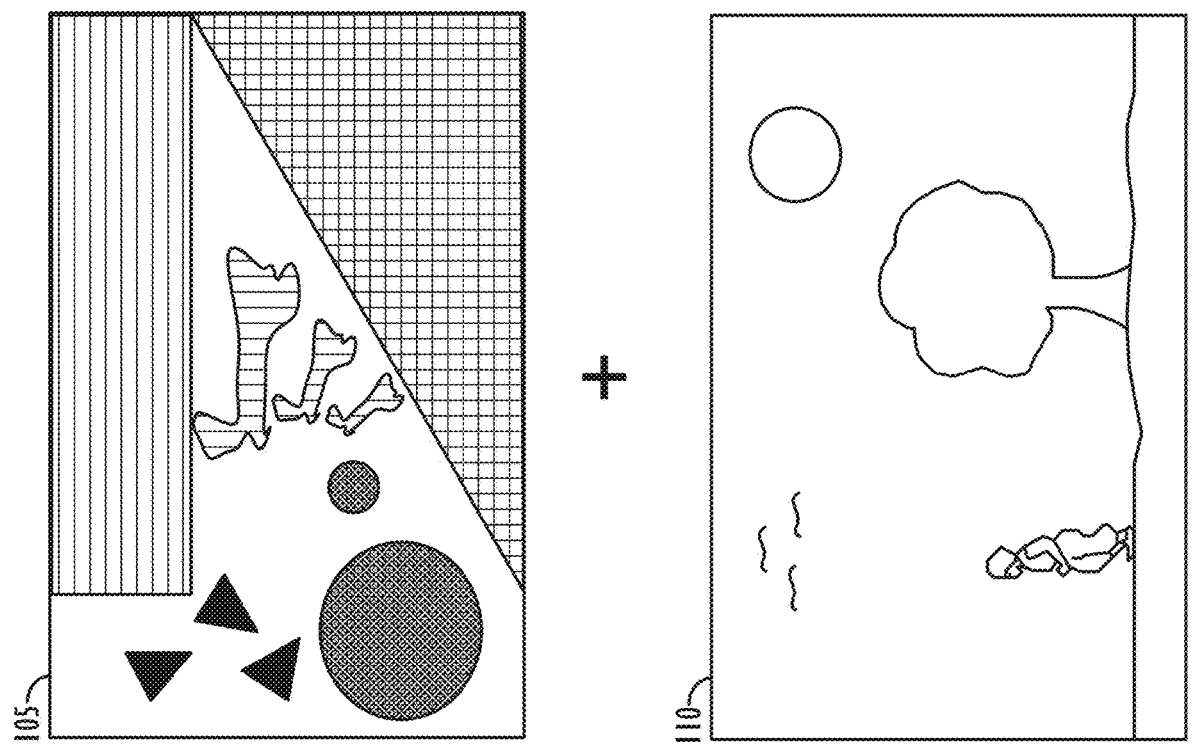

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As explained in Gatys, one class of Deep Neural Networks (DNN) that are especially powerful in image processing tasks are known as Convolutional Neural Networks (CNNs). Convolutional Neural Networks consist of layers of small computational units that process visual information in a hierarchical fashion, e.g., often represented in the form of "layers." The output of a given layer consists of so-called "feature maps," i.e., differently-filtered versions of the input image. The information each layer contains about the input image can be directly visualized by reconstructing the image only from the feature maps in that layer. Higher layers in the network capture the high-level "content" in terms of objects and their arrangement in the input image but do not constrain the exact pixel values of the reconstruction. To obtain a representation of the "style" of an input image, Gatys proposes using a feature space that is built on top of the filter responses in multiple layers of the network and that consists of the correlations between the different filter responses over the spatial extent of the feature maps.

Because the representations of the content and the style of an image may be independently separated via the use of the CNN, both representations may also be manipulated independently to produce new and interesting (and perceptually meaningful) images. For example, as is explained in further detail below, new "stylized" versions of images may be synthesized by finding an image that simultaneously matches the content representation of the photograph (i.e., the "target image") and the style representation of the painting or other work of art that serves as the source style inspiration (i.e., the "source image"). Effectively, this synthesizes a new version of the photograph in the style of the artwork, such that the appearance of the synthesized image resembles the work of art stylistically, even though it shows generally the same content as the photograph. However, for at least the various reasons alluded to above, the Gatys algorithm may not perform well under more onerous device conditions (e.g., processing, time, and/or thermal constraints), and is too computationally-intensive to be applied to stylize images (especially images comprising more than a few megapixels)—let alone video sequences—in real-time or near-real time. Thus, there is a need for further enhancement in the field of artistic style transfer for images and video.

Instance Normalization

In the context of deep learning, "normalization" refers to the process of taking some subset of the input data and attempting to reduce its internal covariate shift by "normalizing" each subset of the data, e.g., based on the computed mean and variance of the subset of data. In particular, with so-called "batch" normalization, multiple batches of data are obtained, wherein each batch comprises multiple examples (e.g., samples, images, etc.) with the same number of feature channels. Then, each data example, $x_i$, in a given batch could be normalized by subtracting the computed mean for the batch from the value of the given data example, $x_i$, and dividing that result by the square root of the variance of the batch (plus some small epsilon value, if desired). The goal, then, of batch normalization, is to control the magnitude and means of the activations of a given layer of the network independently of all other layers in the network, such that network optimizations may be made more easily. In some cases, however, batch sizes may be too small and/or the estimates of mean and variance may prove to be too noisy for batch normalization to be effective.

With one alternative normalization method, i.e., so-called "layer" normalization, rather than normalizing across subsets of data (i.e., batches), layer normalization normalizes the inputs across the same feature channel for all the subsets of data, meaning the results are independent of the other examples.

Another normalization technique that has been found to lead to particularly improved results in artistic style transfer is so-called "instance" normalization. Instance normalization is similar to layer normalization, but it also calculates the aforementioned mean and variance statistics separately across each channel in each example. Instance normalization's usefulness with respect to artistic style transfer derives from the insight that the network should be agnostic to the contrast in the target image that is to be stylized. In fact, in some cases, one goal of the artistic style transfer processes is that the contrast of the stylized output image should actually be similar to the contrast of the source image, and thus the contrast information of the target image that is being stylized can (or should) be discarded to obtain the best stylized image results. For this reason, instance normalization may also be referred to as "contrast normalization."

According to some embodiments of instance normalization, the mean, $\mu_{ti}$, for a given channel of a given example in a batch may be given by:

$$\mu_{ti} = \frac{1}{HW}\sum_{l=1}^{W}\sum_{m=1}^{H} x_{tilm}, \quad \text{(Eqn. 1)}$$

and the variance, $\sigma_{ti}^2$, may be given by:

$$\sigma_{ti}^2 = \frac{1}{HW}\sum_{l=1}^{W}\sum_{m=1}^{H} (x_{tilm} - \mu_{ti})^2, \quad \text{(Eqn. 2)}$$

wherein t refers to the index of the example in the batch, i refers to the feature channel's index, H and W refer to the extents of the spatial dimensions, and l and m refer to indexes into the respective spatial dimensions of the example data.

Thus, an "instance normalized" value, $y_{tijk}$, of a given example value may be computed as:

$$y_{tijk} = \frac{(x_{tijk} - \mu_{ti})}{\sqrt{\sigma_{ti}^2 + \varepsilon}}, \quad \text{(Eqn. 3)}$$

wherein $\varepsilon$ is a small value to avoid divide by zero errors, and j and k refer to indexes into the respective spatial dimensions of the instance normalized example.

As will be explained in further detail below, certain processors may not be suitable for performing the necessary summation operations for computing instance normalization factors (as shown, e.g., in Eqns. 1 and 2, above), but may be particularly fast for performing convolutions and other element-wise operations associated with artistic style transfer using neural networks.

Thus, according to some embodiments described herein, a two-network solution may be employed, e.g., with each network (and any normalization factor computations) being executed on a suitable processing device. Such embodiments may thus, for example, be able to maintain the quality benefits of using instance normalization for artistic style transfer operations (or any other image processing operations requiring such computations), while not experiencing the additional latency and memory costs typically associated with transferring information repeatedly between different processors in a given system or using processors that are not powerful enough to perform such operations on higher resolution images and/or in a real-time or near real-time setting.

Referring now to FIG. 1, an example 100 of an application of an extracted artistic style to a target image is shown, according to one or more embodiments. In example 100, image 105 serves as the source image from which the artistic style will be extracted, and image 110 is the target image that will have the extracted artistic style applied to it to create a stylized version of the target image. In example 100, image 115 represents the resultant stylized version of the target image. It is to be understood that, although the term "artistic" style is used herein with reference to style elements extracted from the source image, the source image does not necessarily need to be a "work of art" or particularly "artistic," though, in some preferred embodiments, the source image may be an image of a painting (or other work of art), as mentioned above. As may be appreciated, any image may serve as a source image, and the stylistic elements of the source image may be extracted and separated from the structural/content elements of such source image, so that the "style" or "essence" of the source image may be applied to a target image with limited disruption to the structural/content elements of the target image, as is described more fully below.

As may now be more fully appreciated, the stylized version of the target image 115 largely retains the same content as the unstylized version of the target image 110. For example, the stylized version of the target image 115 retains the basic layout, shape and size of the main elements of the unstylized version of the target image 110, such as the runner, the tree, the Sun, and the three birds in the sky. However, various elements extracted from the artwork source image 105 are perceivable in the stylized version of the target image 115. For example, the texture from inside the two circles in source image 105 was applied to the Sun and the tree in the stylized version of the target image 115, while the shapes of the Sun and tree have been modified slightly, e.g., based on the contours of the three wavy, vertically-striped objects in the center of source image 105; the style of the black triangles from the source image 105 appear in the arms and legs of the runner and in the trunk of the tree in the stylized version of the target image 115; the horizontally-striped texture from the top of source image 105 was applied to the ground and portions of the sky in the stylized version of the target image 115; the square-filled triangular-shaped texture from the lower-right corner of source image 105 was applied to various portions of the stylized version of the target image 115 in triangular regions; and the contours and texture of the three wavy, vertically-striped objects in the center of source image 105 were applied to the birds in the stylized version of the target image 115.

As is to be understood, the stylized version of the target image 115 shown in FIG. 1 is merely exemplary of the types of style representations that may be extracted from a source image and applied to one or more target images. In a given implementation, the granularity of the style representations that are extracted from the source image and the degree to which one or more source image styles are combined and/or applied to the target image may each be customized to desired levels, e.g., so as to achieve a resulting stylized target image that is visually interesting.

Figure 2:
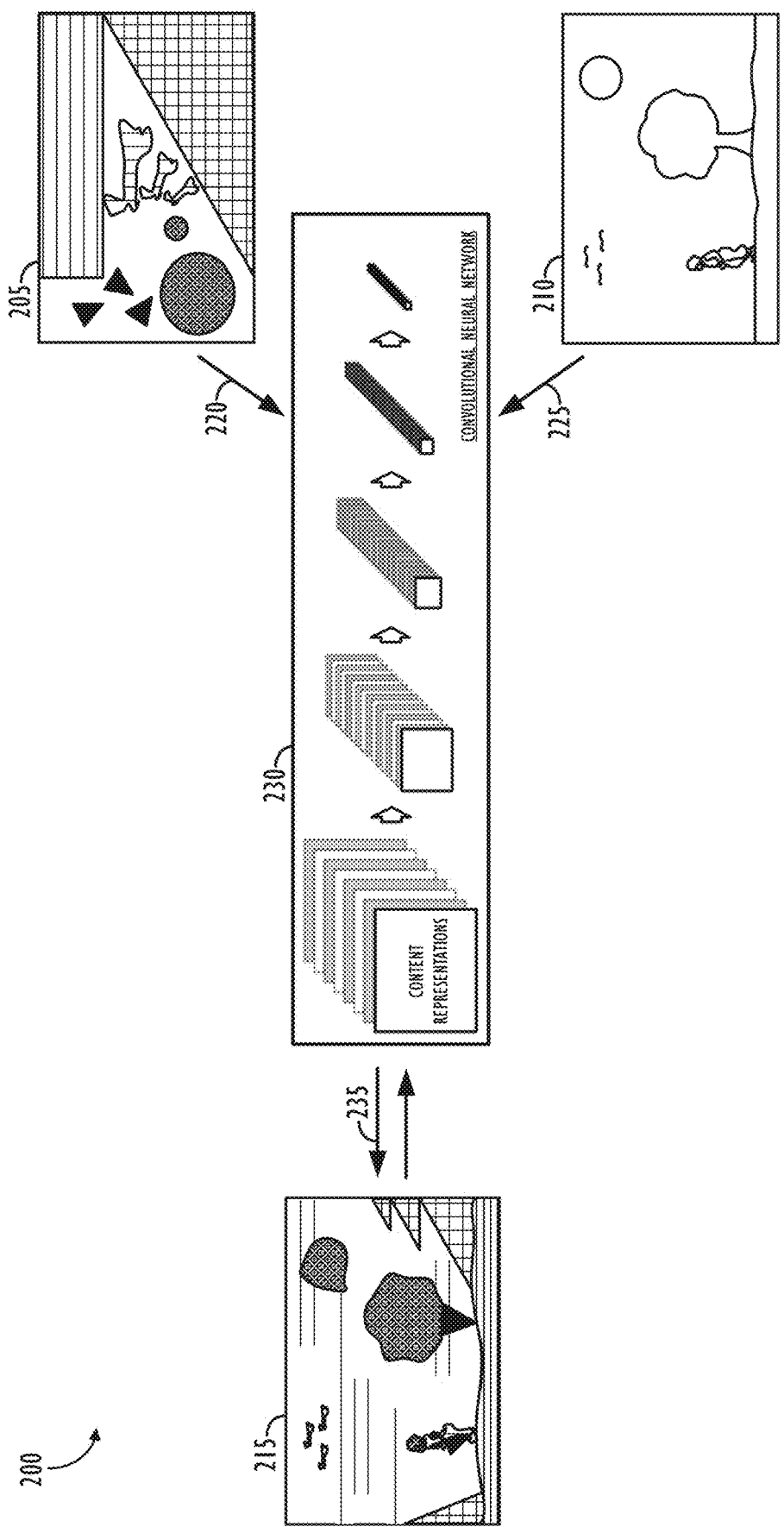
FIG. 2 is an example of a neural network for applying an extracted artistic style to a target image, according to one or more embodiments.

Referring now to FIG. 2, an example 200 of a neural network 230, e.g., a convolutional neural network (CNN), for applying an extracted artistic style to a target image is shown, according to one or more embodiments. In example 200, the source image 205 is the same as source image 105 described above with reference to FIG. 1, and the target image 210 is the same as the target image 110 described above with reference to FIG. 1. As shown, neural network 230 may be used to extract style representation information (220) from the source image 205 and also to extract content representation information (225) from the target image 210. Neural network 230 may then synthesize (235) various versions of a stylized target image 215. Increasing subsets of the CNN layers may be used to match the style representation of the source image in different manners. For example, the image structures that are able to be captured in the style representation may increase in size and complexity when including style features from higher layers of the neural network. The lower layers in neural network 230 may provide an almost perfect reconstruction of the input image, i.e., from a pixel and content standpoint, whereas the higher layers in neural network 230 may lose some pixel information but preserve higher level content representation from the input image.

While the example of FIG. 2 above shows a single neural network for the application of the selected artistic style, according to some embodiments, more than one "version" of style transfer neural network may be created for each artistic style. The different versions of the neural networks may, e.g., operate at different resolution levels, have different numbers of layers, different kinds of layers, different network architectures, and/or have different optimizations applied. The different versions of the neural networks may require different levels of processing resources (or require different types of processing operations, such as summation operations), and, thus, their deployment may be optimized so that they may provide the best quality and/or frame rate of style transfer at any moment in time, given the device's current system performance parameters, e.g., processing load, power state, memory availability, thermal state, etc.

Figure 3B:
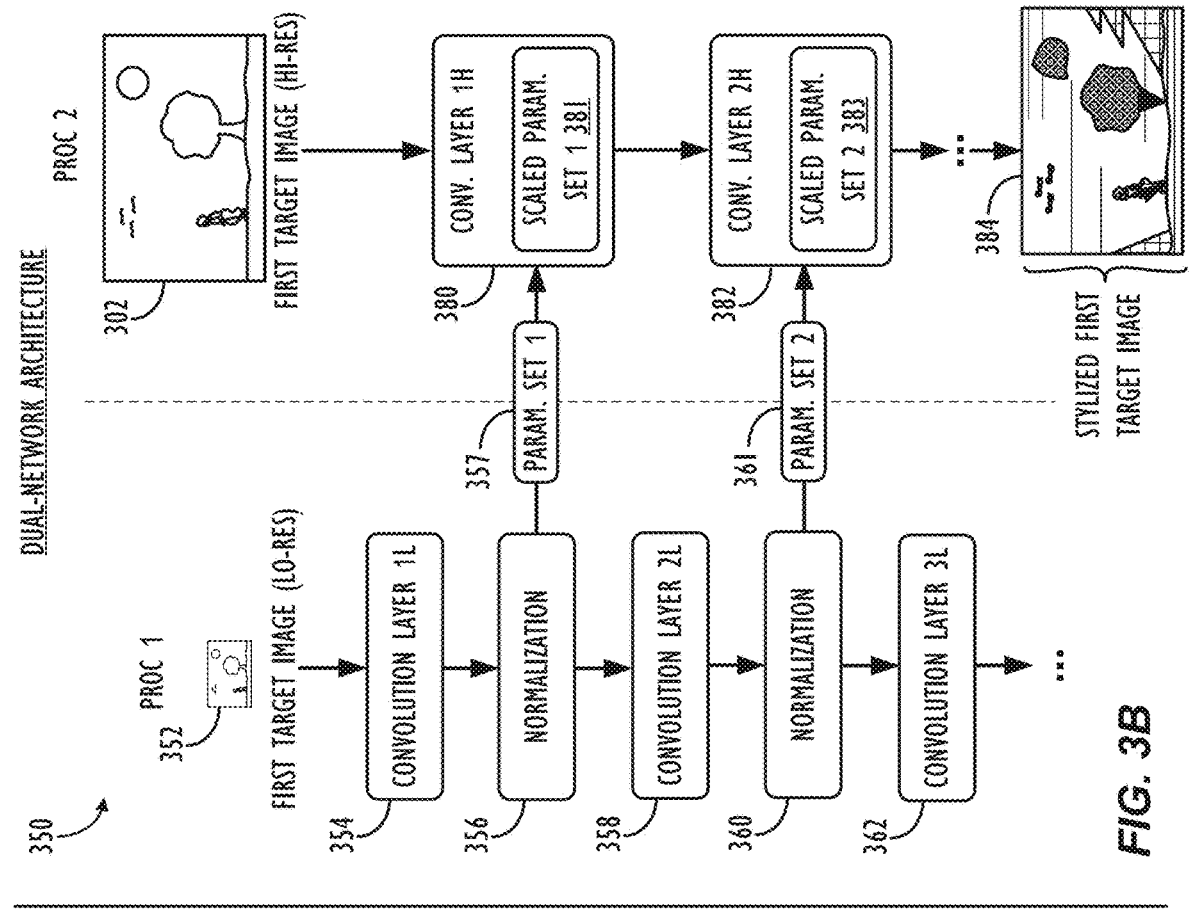
FIGS. 3A-3B are flowcharts illustrating techniques for generating a stylized image or video sequence using either a single-network architecture or a double-network architecture, according to one or more embodiments.
Figure 3A:
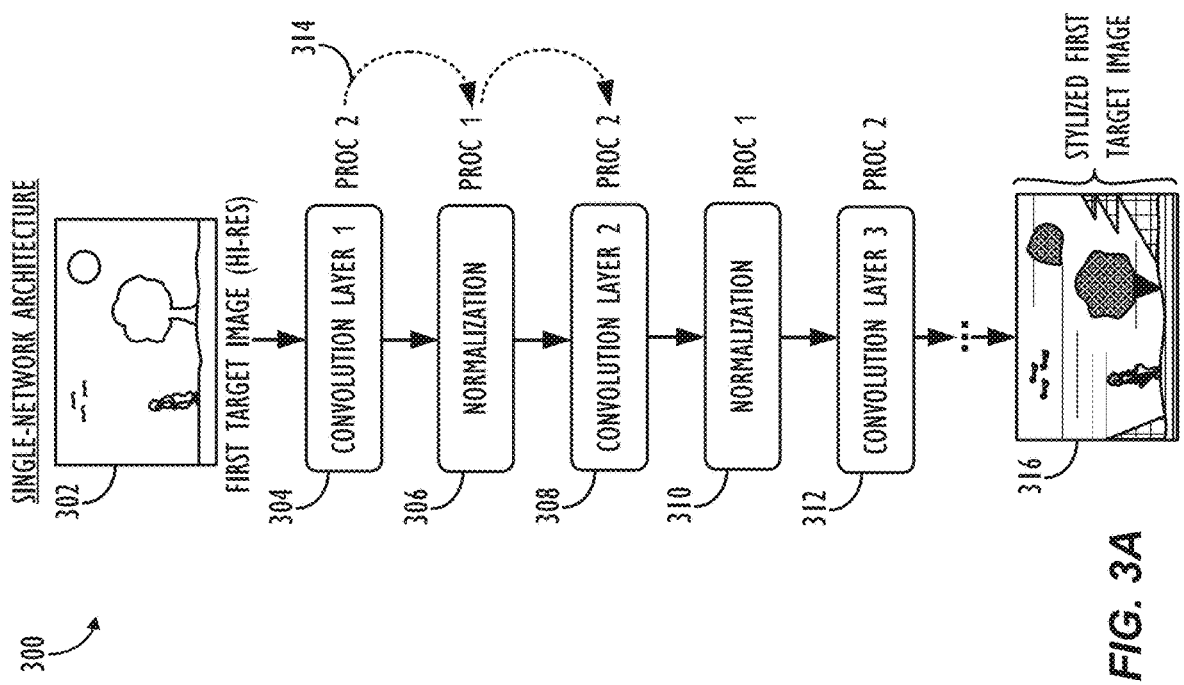

Referring now to FIG. 3A, a flowchart is shown, illustrating techniques for generating a stylized image or video sequence using a single-network architecture. In the example shown in FIG. 3A, the input image comprises a high resolution first target image 302. The stylization process 300 will illustrate an example of using a single neural network architecture, but with both a first and second processing device transferring data between one another multiple times during the stylization of a single image. Stylization process 300 may begin at Step 304 by evaluating a first convolution layer ("CONVOLUTION LAYER 1") on a second processing device ("PROC 2"). Next, the results of Step 304 may be transferred to a normalization operation ("NORMALIZATION") at Step 306, which may be performed on a first processing device ("PROC 1"). As mentioned above, certain processing devices may be better suited for performing the operations associated with calculating normalization factors (e.g., summation operations). In the example of FIG. 3A, PROC 1 is the processor that is better able to calculate the normalization factors.

Next, the normalization factors may be transferred back to PROC 2, so that the second convolution layer ("CONVOLUTION LAYER 2") may be evaluated on the second processing device, PROC 2, at Step 308. This repeated transfer of data and normalization factors between PROC 1 and PROC 2 in the stylization process 300 is illustrated by dashed arrow line 314. The process of generating normalization factors by a first processing device and evaluating convolutional layers at a second processing device may continue for as many layers are in the style transfer network (e.g., as shown in Steps 310, 312, and the ellipses) until the final output stylized version of the first target image 316 is generated by the network. As mentioned above, the numerous transfers between processing devices with each layer of the network, as illustrated in FIG. 3A, can lead to undesirable latency and memory costs.

Referring now to FIG. 3B, a flowchart 350 is shown, illustrating techniques for generating a stylized image or video sequence using a double-network architecture, according to one or more embodiments. Unlike the single-network architecture illustrated in FIG. 3A, in FIG. 3B, a first processing device, PROC 1, may be used exclusively to operate on a lower resolution version 352 of the first target image. In some embodiments, the lower resolution version 352 of the first target image may be the result of a downscaling and/or sub-sampling of the high resolution first target image 302, e.g., an 8× or 16× downscaling. In the example of FIG. 3B, the first processing device may proceed to evaluate the various convolutional layers of the artistic style transfer network (e.g., as shown in Steps 354, 358, and 362), largely as described above with reference to FIG. 3A, but simply on a lower resolution version of the first target image. For the output of each convolutional layer, one or more sets of parameters (e.g., normalization factors and/or scaled or biased versions thereof) may be determined (e.g., as shown in Steps 356 and 360), and packaged as a parameter set to be transferred to the version of the neural network running on the second processing device, PROC 2. For example, the first parameter set 357 ("PARAM. SET 1") may be applied to the input of the first convolutional layer 380 of a higher resolution artistic style transfer network executing on the second processing device, PROC 2. Likewise, the second parameter set 361 ("PARAM. SET 2") may be applied to the input of the second convolutional layer 382 of the higher resolution artistic style transfer network executing on the second processing device, and so forth for each such layer in the network for which parameters are necessary or desired.

As illustrated in Steps 380 and 382 of FIG. 3B, the parameter sets from the lower resolution network running on the first processing device may be scaled according to one or more operations (resulting in, e.g., "Scaled Parameter Set 1" 381 and "Scaled Parameter Set 2" 383) before being applied to data in the respective corresponding layer of the higher resolution network executing on the second processing device. The parameters determined by the lower resolution network may need to be scaled, e.g., in order to account for the differences in resolution between the network on which the normalization factors were calculated and the network to which they will be applied. As with FIG. 3A, the application of the various convolutional layers on the second processing device will result in the final, high resolution output stylized version of the first target image 384 being generated by the higher resolution network on the second processing device.

According to some embodiments, the aforementioned scaling operations to map the parameters determined on the lower resolution network to appropriate corresponding values for the higher resolution network may follow an empirically determined mapping operation, e.g., a linear mapping. In other embodiments, more complicated statistical modeling and/or transformations may be applied to the parameters before they are applied to the higher resolution network. In still other embodiments, a neural network (e.g., a single layer network) could even be applied to predict how the parameters as determined on the lower resolution network should be mapped to corresponding values for application to the corresponding layers of the higher resolution network.

Although the parameter sets in FIG. 3B appear to be illustrated as being transferred to the higher resolution network executing on the second processing device in a serial fashion, according to some embodiments, it may be desirable to evaluate all the convolutional layers on the lower resolution network (e.g., 354/358/362, etc.) first (including any normalization factors or other parameters that may be generated), then calculate all the scaled parameter set values (e.g., 381/383, etc.) to transfer over to the higher resolution network executing on the second processing device, and then finally evaluate all the layers of the higher resolution network on the second processing device (e.g., 380/382, etc.) using the scaled parameter set values for the corresponding layers of the higher resolution network. In this way, there would be only a single transfer of data/parameters between the first processing device and the second processing device, which can further assist with reducing latency of the overall artistic stylization operation and avoiding potential synchronization issues between the first processing device and second processing device.

Figure 4:
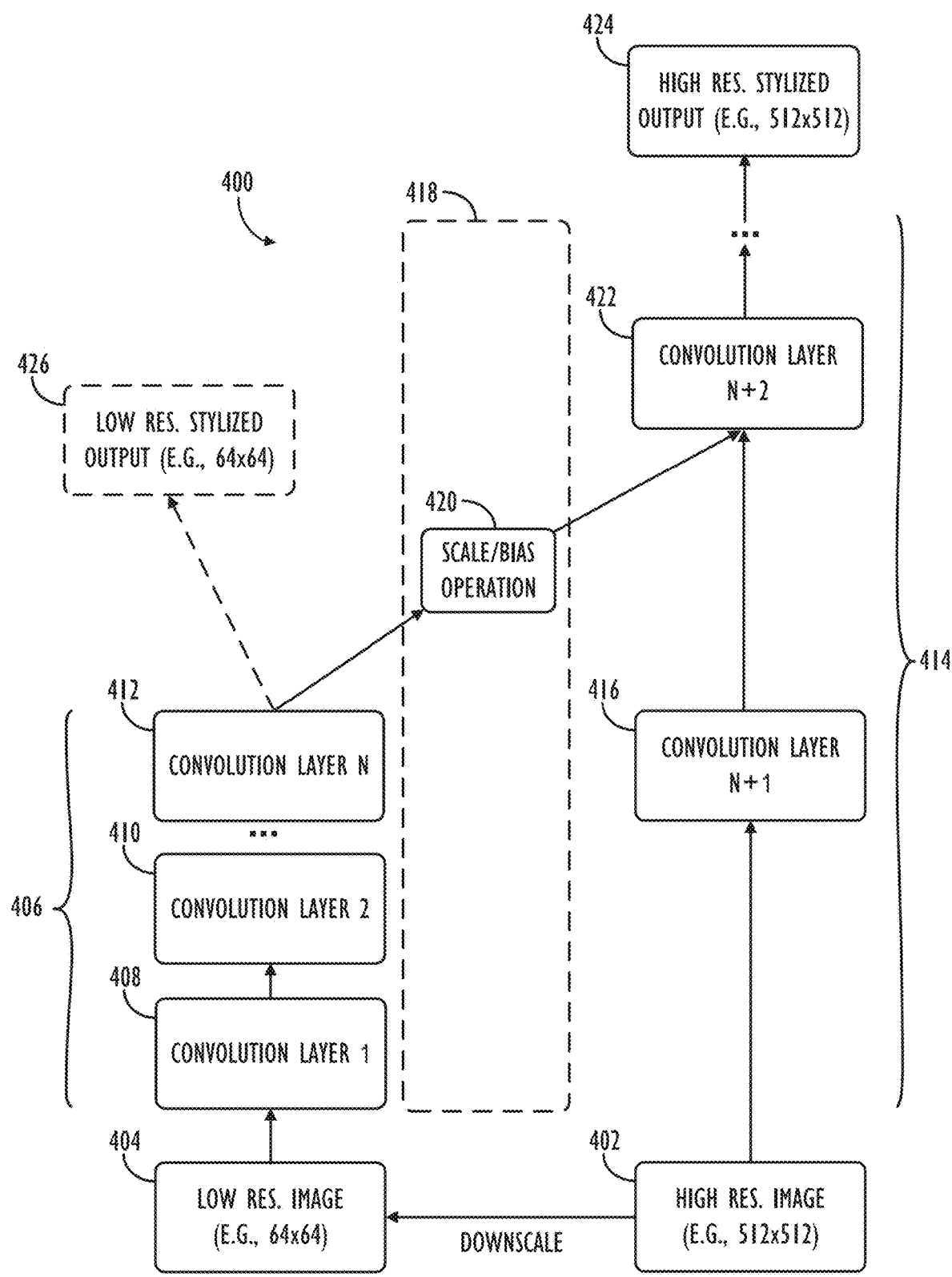
FIG. 4 illustrates an example of a hybrid neural network architecture, which uses connections to map parameters between a first part of the network and a second part of the network, according to one or more embodiments.

Referring now to FIG. 4, an example of a hybrid neural network architecture, which uses connections to map parameters between a first part of the network and a second part of the network is illustrated, according to one or more embodiments. As shown in FIG. 4, the neural network 400 may comprise a hybrid architecture, e.g., including a first part, e.g., lower resolution network (406), that may be executed on a first processing device and that may comprise many convolutional layers (e.g., 408, 410, 412, etc.) and a second part, e.g., higher resolution network (414) that may be executed on a second processing device and that may also comprise a number of convolutional layers (e.g., 416, 422). In some implementations, the use of a hybrid network architecture (e.g., with two or more parts having distinct characteristics, executed on different processing devices, and/or used for distinct processing operations) has been shown to cut processing time required to stylize images by a factor of up to ten or more, while still achieving results that look nearly as good as prior art networks that utilize exclusively high-resolution layers.

As shown in FIG. 4, the higher resolution network 414 may operate on incoming image data (402), e.g., a first target image that an artistic style is to be applied to, which is at a higher resolution, e.g., 512×512 (meaning 512 rows and 512 columns of pixels per image). A higher resolution network may, in part, be desirable, so as to preserve the edges, textures, or other high-resolution details in the original input image. Concurrently (or prior) to the processing being performed by higher resolution network 414, the input image may be downscaled to a lower resolution, e.g., 64×64 pixels, by use of a hardware and/or software scalar and passed to the lower resolution network 406 in the form of a low-resolution input image (404). It is to be understood that the exemplary resolutions shown in FIG. 4 are merely given for illustrative purposes.

According to some embodiments, one or more layers of the lower resolution network 406, e.g., convolution layer N (412), may generate one or more parameters, such as the aforementioned instance normalization factors. These parameters may then be passed, e.g., through a connective portion, such as intermediate layer 418 of the network 400, to one or more corresponding layers on the higher resolution network 414. As mentioned above, one or more scaling and/or biasing operations (420) may be applied to the parameters generated by the lower resolution network convolution layer (e.g., 412) before they may be applied to the corresponding higher resolution network convolution layer (e.g., 422). As also mentioned above, according to some embodiments, the lower resolution network 406 may be executed on one or more processing devices uniquely suited to determining the aforementioned sets of parameters, while the higher resolution network 414 may be executed on one or more processing devices that are better able to operate and evaluate convolutional layers on higher resolution images (though may not be as well-suited to determine the sets of parameters), thus resulting in a better quality stylized output image. According to some embodiments, any parameters (or scaled/biased versions of such parameters) determined by the lower resolution network 406 may be transferred through the connective portion of the network 418 to the higher resolution network 414 in a single transfer operation, so as to minimize the number of transfers of information between processing devices during the stylization of a single image frame.

The output of the lower resolution network 406, i.e., after processing by each of convolutional layers 1 . . . N in the network (as well as one or more additional optional low resolution convolutions following layer N, if needed), may also be output as its own low resolution stylized output image (426), if so desired. According to some embodiments utilizing a hybrid network architecture, such as the network 400 shown in FIG. 4, the output of the higher resolution network 414, i.e., after processing by convolutional layer N+2 (422), may result in a high resolution stylized output image (424). [Additional upsampling and/or downsampling layers (not pictured) may also be employed by the network so that the output of various layers may readily combine with the other layers in the network.]

According to some embodiments, further enhancements and/or adjustments may be made to the high resolution stylized output image (424). In one such embodiment, the high resolution stylized output image (424) may be combined with an input target image, e.g., an even higher resolution input image, such as the original image captured by the device. An enhanced higher resolution output image may be then generated, e.g., by blending between the high resolution stylized output image (424) and the even higher resolution input image. In some embodiments, the blending process may comprise the use of bilateral filter and/or Lanczos filter (or similar desired filter) to smooth the upscaling of the stylized output to the even higher resolution level. In other embodiments, the generation of an enhanced higher resolution output image may further comprise the use of an edge enhancement algorithm to bring back out the edges from the original captured image. By allowing the user the option of controlling the degree of blending between the high resolution stylized output image (424) and the higher resolution input image, the network 400 may provide the user with control over the "feeling" of the output image, e.g., how much of style (e.g., the hue) of the original image is imparted into the final image. In this way, the output image may be intentionally over-saturated, made to look black and white, or the user may attempt to accurately reflect the hues in the original captured input image, etc. Due to the real-time nature of the network and the efficiency of the hybrid architecture, the final blending step of block may also be adjusted and reflected in real-time, should the user so desire.

It is also noted that complex networks like style transfer networks often have many layer types other than convolution layers. Image-to-image networks are usually characterized by small filter size and large image size, thereby increasing their requirements, in terms of memory bandwidth, for layer intermediate data. To reduce bandwidth usage, and hence both power and time, various fusions of operations may be performed on the network data. Additionally, the reuse of memory for intermediate data can alleviate additional runtime memory pressures.

Figure 5:
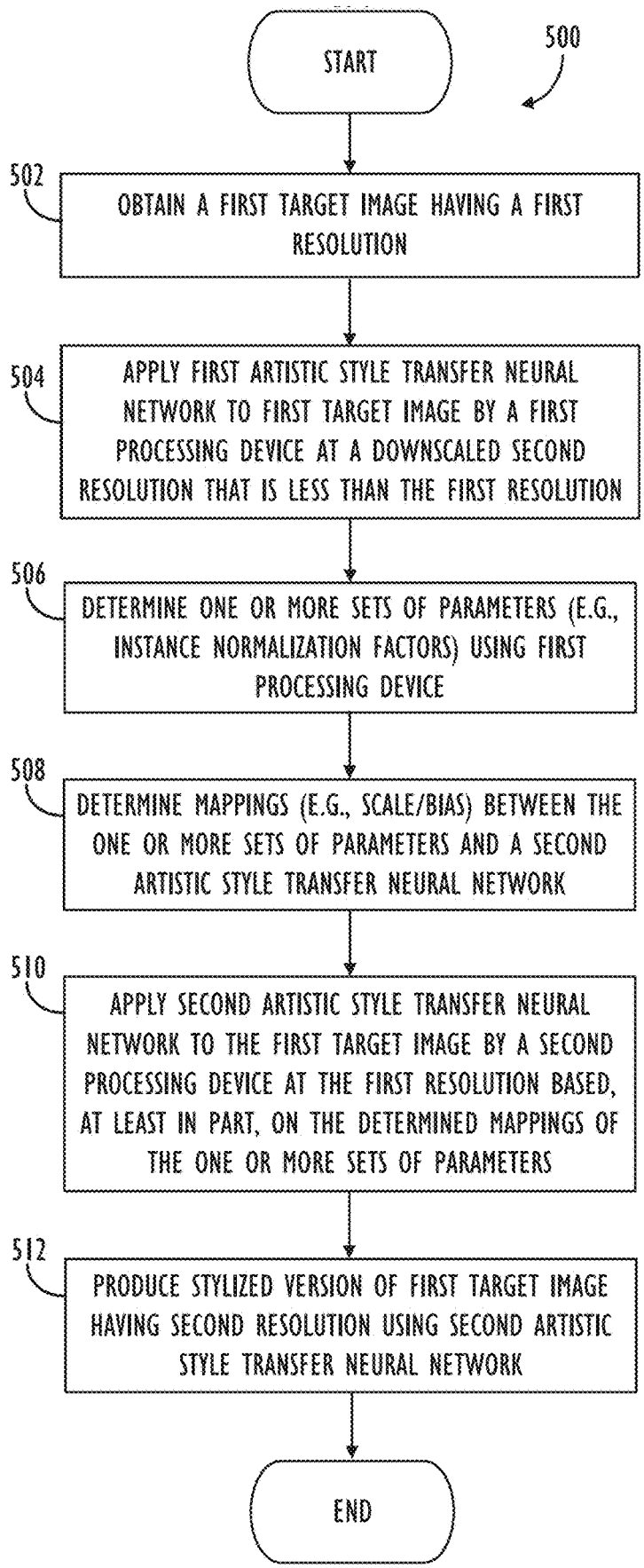
FIG. 5 is a flowchart illustrating a technique for generating a stylized image or video sequence using a double-network architecture, according to one or more embodiments.

Referring now to FIG. 5, a flowchart 500 illustrating a technique for generating a stylized image or video sequence using a double-network architecture is shown, according to one or more embodiments. First, at Step 502, a first target image having a first resolution may be obtained. Next, at Step 504, a first artistic style transfer neural network may be applied to a first target image by a first processing device at a second resolution. As described above, in some embodiments, the second resolution may comprise a downscaled version of the first, i.e., original, resolution of the first target image, and the first processing device may be a processing device with certain desired capabilities, e.g., the ability to quickly compute one or more normalization factors or other parameters related to the image data of the first target image.

As Step 506, one or more sets of parameters (e.g., the aforementioned instance normalization factors) may be determined using the first processing device and the first target image data at the second resolution. Next, at Step 508, various mappings (e.g., scaling and/or biasing operations) may be determined to modify the determined one or more sets of parameters for application to the second artistic style transfer neural network executed on the second processing device at the first resolution, wherein, e.g., the first resolution that may be substantially larger than the downscaled second resolution evaluated by the first artistic style transfer neural network.

At Step 510, the mapped versions of the one or more sets of parameters may be applied by the second artistic style transfer neural network to the first target image on a second processing device and at the first resolution. Finally, at Step 512, a stylized version of the first target image having the first resolution may be produced using the second artistic style transfer neural network on the second processing device. As mentioned above, if so desired, additional processing may be performed on the stylized image, e.g., to further filter, upscale, modify, etc., the stylized image to the creator's preferences.

While FIG. 5 is described above in the specific context of artistic style transfer for images using neural networks, as mentioned above, the techniques described herein may be applied more generally to any complex computational task that would benefit from the modification of a neural network for optimal computation on two or more discrete processing devices. For example, the techniques described herein may be generalized to any neural network comprised of any mathematical operations for which some operations are performed more optimally on a first processing device, some operations are performed more optimally on a second processing device, and wherein the mathematical decomposition can yield parallel computation graphs. In other words, the techniques described herein may be extended to any situation wherein the different optimal mathematics for the two or more processing devices involved can yield improved performance and/or results that would not be achievable utilizing only one processing device at a time.

Exemplary Electronic Device

Figure 6:
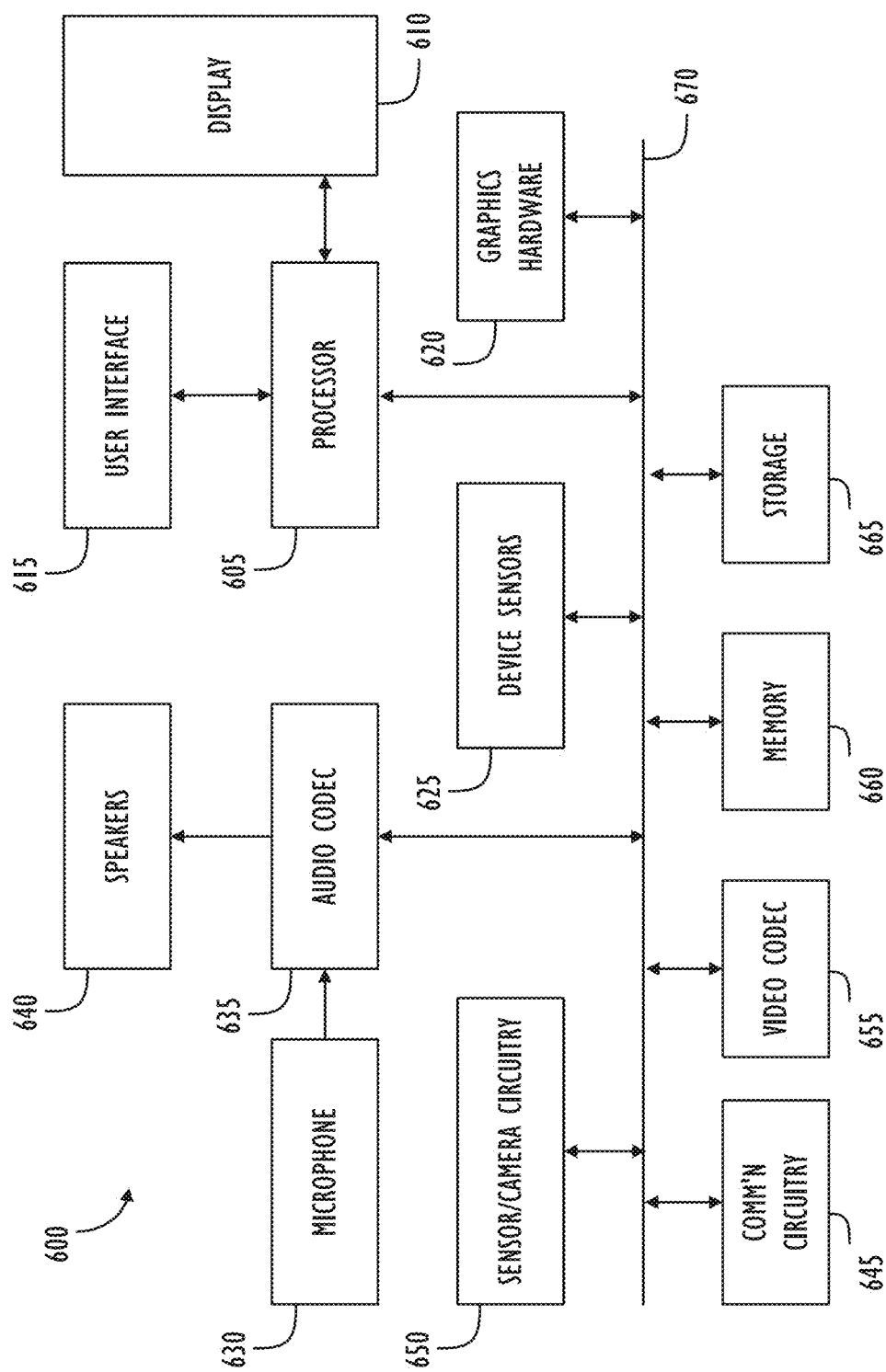
FIG. 6 is a block diagram illustrating a programmable electronic device, in which one or more of the techniques disclosed herein may be implemented.

Referring now to FIG. 6, a simplified functional block diagram of illustrative programmable electronic device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, sensor/camera circuitry 650, which may, e.g., comprise multiple camera units/optical sensors having different characteristics (as well as camera units that are housed outside of, but in electronic communication with, device 600), video codec(s) 655, memory 660, storage 665, and communications bus 670.

Processor 605 may execute instructions necessary to carry out or control the operation of many functions performed by device 600 (e.g., such as the generation and/or processing of images in accordance with the various embodiments described herein). Processor 605 may, for instance, drive display 610 and receive user input from user interface 615. User interface 615 can take a variety of forms, such as a button, keypad, dial, a click wheel, keyboard, display screen and/or a touch screen. User interface 615 could, for example, be the conduit through which a user may view a captured video stream and/or indicate particular frame(s) that the user would like to have a particular stabilization constraint(s) applied to (e.g., by clicking on a physical or virtual button at the moment the desired frame is being displayed on the device's display screen).

In one embodiment, display 610 may display a image stream as it is captured while processor 605 and/or graphics hardware 620 and/or image capture circuitry contemporaneously generate a stylized version of the captured image stream, storing the image stream in memory 660 and/or storage 665. Processor 605 may be a system-on-chip such as those found in mobile devices and include one or more central processing units (CPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 in performing computational tasks. In one embodiment, graphics hardware 620 may include one or more programmable graphics processing units (GPUs) and/or one or more specialized SoCs. As mentioned above, in some embodiments, the graphics hardware 620 may comprise a first processing device having a first set of capabilities and second processing device having a second set of capabilities, wherein the first and second processing devices may work together according to a specified protocol to perform a graphics or image processing task, such as artistic style transfer of images or video. As mentioned above, the repeated transfer of data between processor 605 and graphics hardware 620 may have a high cost in terms of latency and/or memory utilization, thus, according to some embodiments, it may be desirable to limit, to the greatest extent possible, the amount of data transfer between processor 605 and graphics hardware 620 (as well as between individual processing devices that may comprise the graphics hardware 620) during the performance of a graphics operation.

Sensor/camera circuitry 650 may comprise one or more camera units configured to capture images, e.g., images which may be processed to generate stylized versions of said captured images, e.g., in accordance with this disclosure. Output from sensor/camera circuitry 650 may be processed, at least in part, by video codec(s) 655 and/or processor 605 and/or graphics hardware 620, and/or a dedicated image processing unit incorporated within sensor/camera circuitry 650. Images so captured may be stored in memory 660 and/or storage 665. Memory 660 may include one or more different types of media used by processor 605, graphics hardware 620, and sensor/camera circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. For example, the above-described embodiments may be used in combination with each other. Many other embodiments will be apparent to those of skill in the art upon reviewing the above description. For example, dual-network architectures may also be applied in other artificial intelligence and/or machine learning applications, wherein particular processing devices may be able to evaluate particular neural networks or perform particular operations more effectively or efficiently than other processing devices within a given system. The scope of the invention therefore should be determined with reference to the appended claims, along with the full scope of equivalents to which such claims are entitled.

What is claimed is:

1. A device, comprising:
   an image sensor;
   a memory operatively coupled to the image sensor;
   two or more processing devices operatively coupled to the memory and configured to execute instructions to:
   obtain a first target image having a first resolution;
   downscale the first target image to create a downscaled first target image having a second resolution, wherein the second resolution is less than the first resolution;
   apply, using a first processing device of the two or more processing devices, a first artistic style transfer neural network to the downscaled first target image;
   determine, using the first processing device, one or more sets of parameters based on the application of the first artistic style transfer neural network;
   determine mappings between the one or more sets of parameters and a second artistic style transfer neural network; and
   apply, using a second processing device of the two or more processing devices, the second artistic style transfer neural network to the first target image based, at least in part, on the determined mappings to produce a stylized version of the first target image having the first resolution.

2. The device of claim 1, wherein:
   the first target image is obtained from the image sensor.

3. The device of claim 1, wherein:
   the first processing device comprises graphics processing unit (GPU); and
   the second processing device comprises a System on a Chip (SoC).

4. The device of claim 1, wherein the instructions to determine the mappings further comprise instructions to perform at least one of:
   a scaling operation; a biasing operation; a linear mapping operation; or an evaluation of a neural network.

5. The device of claim 1, further comprising instructions to:
   transfer the determined mappings to the second artistic style transfer neural network in a single transfer operation.

6. The device of claim 1, wherein:
   each set of the one or more sets of determined parameters corresponds to a particular layer in the first artistic style transfer neural network.

7. The device of claim 6, wherein:
   each set of the one or more sets of mapped parameters are applied to a corresponding layer in the second artistic style transfer neural network.

8. A non-transitory program storage device comprising instructions stored thereon to cause two or more processing devices to:
   obtain a first target image having a first resolution;
   downscale the first target image to create a downscaled first target image having a second resolution, wherein the second resolution is less than the first resolution;
   apply, using a first processing device of the two or more processing devices, a first artistic style transfer neural network to the downscaled first target image;
   determine, using the first processing device, one or more sets of parameters based on the application of the first artistic style transfer neural network;
   determine mappings between the one or more sets of parameters and the second artistic style transfer neural network; and
   apply, using a second processing device of the two or more processing devices, a second artistic style transfer neural network to the first target image based, at least in part, on the determined mappings to produce a stylized version of the first target image having the first resolution.

9. The non-transitory program storage device of claim 8, wherein:
   the first processing device comprises and graphics processing unit (GPU); and the second processing device comprises a System on a Chip (SoC).

10. The non-transitory program storage device of claim 8, wherein the instructions to determine the mappings further comprise instructions to perform at least one of:
a scaling operation; a biasing operation; a linear mapping operation; or an evaluation of a neural network.

11. The non-transitory program storage device of claim 8, further comprising instructions to:
transfer the determined mappings to the second artistic style transfer neural network in a single transfer operation.

12. The non-transitory program storage device of claim 8, wherein:
each set of the one or more sets of determined parameters corresponds to a particular layer in the first artistic style transfer neural network.

13. The non-transitory program storage device of claim 12, wherein:
each set of the one or more sets of mapped parameters are applied to a corresponding layer in the second artistic style transfer neural network.

14. A computer-implemented method, comprising:
obtaining a first target image having a first resolution;
downscaling the first target image to create a downscaled first target image having a second resolution, wherein the second resolution is less than the first resolution;
applying, using a first processing device, a first artistic style transfer neural network to the downscaled first target image;
determining, using the first processing device, one or more sets of parameters based on the application of the first artistic style transfer neural network;
determining mappings between the one or more sets of parameters and the second artistic style transfer neural network; and
applying, using a second processing device, a second artistic style transfer neural network to the first target image based, at least in part, on the determined mappings to produce a stylized version of the first target image having the first resolution.

15. The computer-implemented method of claim 14, wherein:
the first processing device comprises graphics processing unit (GPU); and
the second processing device comprises a System on a Chip (SoC).

16. The computer-implemented method of claim 14, wherein determining the mappings further comprises performing at least one of:
a scaling operation; a biasing operation; a linear mapping operation; or an evaluation of a neural network.

17. The computer-implemented method of claim 14, further comprising:
transferring the determined mappings to the second artistic style transfer neural network in a single transfer operation.

18. The computer-implemented method of claim 14, wherein:
each set of the one or more sets of determined parameters corresponds to a particular layer in the first artistic style transfer neural network.

19. The computer-implemented method of claim 18, wherein:
each set of the one or more sets of mapped parameters are applied to a corresponding layer in the second artistic style transfer neural network.

20. The computer-implemented method of claim 14, further comprising:
upscaling the stylized version of the first target image to have a resolution larger than the first resolution.

21. A computer-implemented method, comprising:
receiving a request to perform a first processing task utilizing a first neural network;
modifying a first portion of the first neural network based, at least in part, on capabilities of a first processing device;
modifying a second portion of the first neural network based, at least in part, on capabilities of a second processing device;
performing, on the first processing device, at least a first part of the first processing task using at least the modified first portion of the first neural network;
determining, using the first processing device, one or more sets of parameters based on the use of at least the modified first portion of the first neural network;
determining mappings between the one or more sets of parameters and the second portion of the first neural network; and
performing, on the second processing device, at least a second part of the first processing task using at least the modified second portion of the first neural network and the determined mappings.

22. The computer-implemented method of claim 21, wherein the first processing task comprises an artistic style transfer operation for an image.

23. The computer-implemented method of claim 21, wherein:
the first processing device comprises a graphics processing unit (GPU); and
the second processing device comprises a System on a Chip (SoC).

24. The computer-implemented method of claim 21, further comprising:
transferring the determined mappings to the second portion of the first neural network in a single transfer operation.

25. The computer-implemented method of claim 21, wherein:
each set of the one or more sets of determined parameters corresponds to a particular layer in the second portion of the first neural network.

26. The computer-implemented method of claim 21, wherein:
each set of the one or more sets of mapped parameters are applied to a corresponding layer in the second portion of the first neural network.

* * * * *